Figure 1:
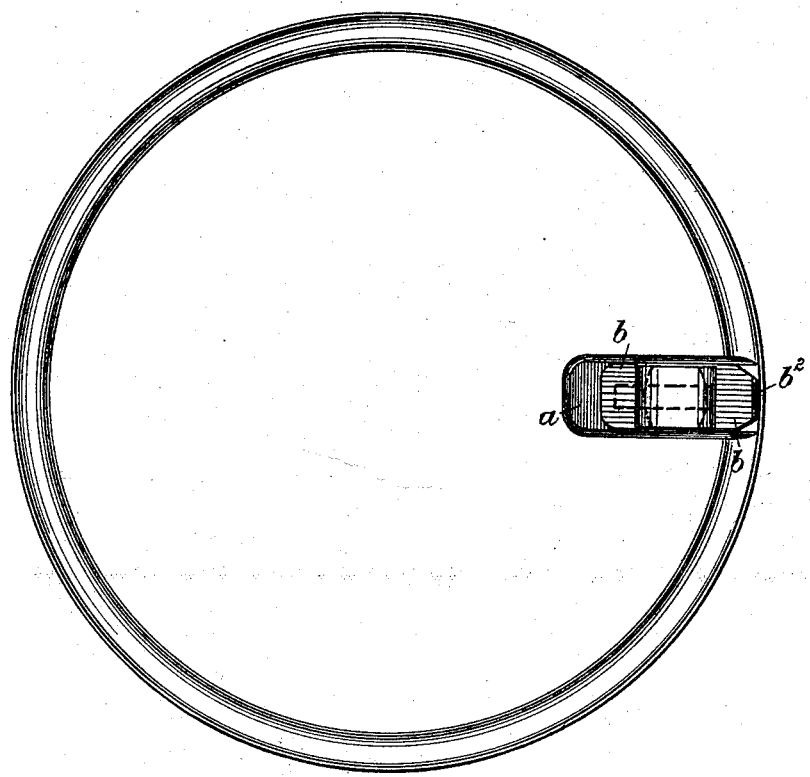

No. 609,379. Patented Aug. 16, 1898.
G. H. WILLIAMSON.
LOOSE COVER AND CUTTER FOR HERMETICALLY SEALED METALLIC BOXES OR CASES.
(Application filed Nov. 22, 1897.)
(No Model.) 2 Sheets—Sheet 1.

Witnesses:—
George Shaw
Arthur John Powell

Inventor:—
George Henry Williamson

No. 609,379. Patented Aug. 16, 1898.
G. H. WILLIAMSON.
LOOSE COVER AND CUTTER FOR HERMETICALLY SEALED METALLIC BOXES OR CASES.
(Application filed Nov. 22, 1897.)
(No Model.) 2 Sheets—Sheet 2.
Fig. 7.
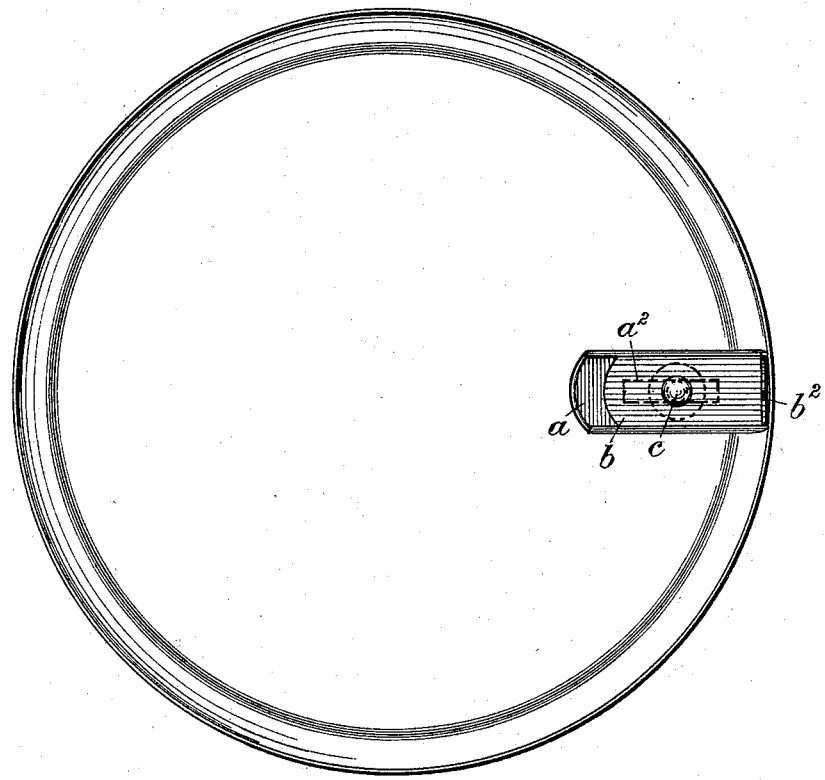
Fig. 8.
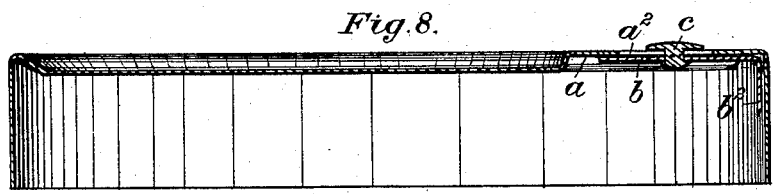
Fig. 9. Fig. 10.
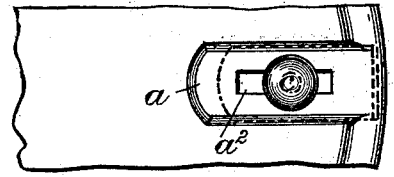 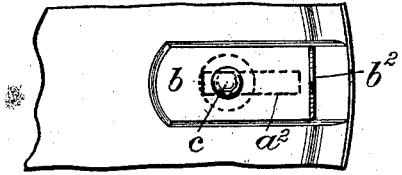
Fig. 11.
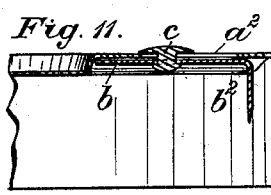
Witnesses:—
George Shaw
Arthur John Powell
Inventor:—
George Henry Williamson

UNITED STATES PATENT OFFICE.

GEORGE HENRY WILLIAMSON, OF WORCESTER, ENGLAND.

LOOSE COVER AND CUTTER FOR HERMETICALLY-SEALED METALLIC BOXES OR CASES.

SPECIFICATION forming part of Letters Patent No. 609,379, dated August 16, 1898.

Application filed November 22, 1897. Serial No. 659,508. (No model.)

*To all whom it may concern:*

Be it known that I, GEORGE HENRY WILLIAMSON, a subject of the Queen of Great Britain, residing at the city of Worcester, England, have invented certain new and useful Improvements in the Loose Covers and Cutters for Hermetically - Sealed Metallic Boxes or Cases; and I do hereby declare that the following is a full, clear, and exact description of the invention, which will enable others skilled in the art to which it appertains to make and use the same.

My invention relates to the hermetically-sealed cylindrical metallic boxes or cases for containing articles of food, tobacco, cigarettes, snuff, and paint and for other like purposes, which boxes or cases are provided with loose covers, to which radial sliding cutters are attached, so that when the sliding cutters are brought into their acting position and the loose covers are pressed on the tops of the boxes or cases the cutters puncture the tops of the boxes or cases, and by the rotation of the loose covers the tops of the boxes or cases are cut out.

In each of the loose covers as ordinarily constructed, there are two parallel slots through and in which the edges of the radial sliding cutter pass and work, the said slot being slightly open after the wings of the cutter are passed through them.

The object of my invention is so to construct the loose covers and cutters that the said loose covers when in position on their boxes or cases are closed practically air-tight.

In constructing a loose cover according to my invention I make a depression or recess in the lid of a size and shape suitable for the cutter to slide in, the said depression guiding the cutter in its sliding motion. I make one radial slot only in the said cover, and I form on the cutter to be used therewith a pair of parallel arms or branches at the middle of its upper side, which are passed through the said slot from the inner side of the cover, and being bent over the two opposite edges of the slot constitute the attachment of the cutter, the slot being closed by the cutter situated under the slot.

In another of my improvements I make on either side the slot a parallel depression or groove in the under side of the loose cover and form projections or ribs on or turn up the sides of the cutter, so as to take and work in the said grooves. The said turned-up sides act as guides and preserve the parallel motion of the cutter.

Figure 2:
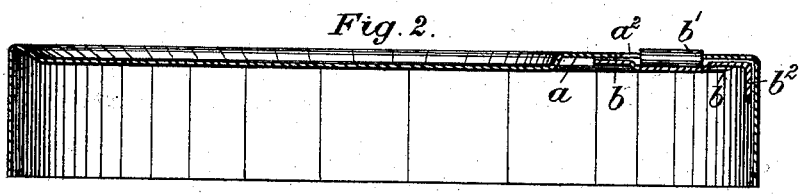
Figure 5:
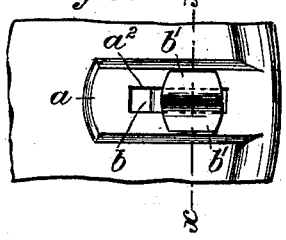
Figure 6:
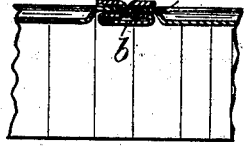
Figure 3:
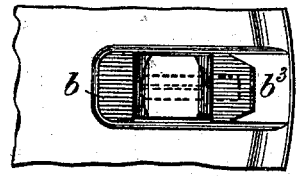
Figure 4:
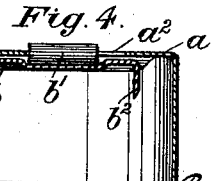

Figure 1 of the accompanying drawings represents in plan of under side and Fig. 2 in section a loose lid or cover and cutter made according to my invention for a hermetically-sealed cylindrical box or case, the cutter attached to the said loose lid or cover being in its non-acting position. Figs. 3 and 4 represent portions of the said loose lid or cover and cutter in plan of under side and section, respectively, the cutter being in these figures in its acting or drawn-back position. Fig. 5 represents a portion of the loose lid or cover and cutter in plan of upper side, and Fig. 6 represents a cross-section of the same on the line $x\,x$, Fig. 5. Figs. 7 to 11, both inclusive, represent a modification of my invention hereinafter described.

The same letters of reference indicate the same parts in the several figures of the drawings.

I will first describe the arrangement of my invention represented in Figs. 1 to 6, both inclusive.

The part near one side of the loose lid or cover to which the cutter is to be attached is preferably raised, so as to form a sunken part or recess $a$ in the under side of the loose lid or cover for the reception of the cutter $b$, the said sunken part or recess $a$ having a single slot $a^2$ made in it, which is closed practically air-tight and dust-proof on the attachment of the cutter $b$ in the manner hereinafter described.

The cutter $b$ is formed from a blank of thin sheet-steel of a cruciform shape, having a turned-down point or cutter proper, $b^2$, at its front end, the cross-arms of the said blank being bent back on the body of the cutter in a manner similar to the prongs of a paper-fastener, so as to permit of their being passed through the single slot $a^2$ of the sunken part $a$ of the cover. The cross-arms (marked $b'\,b'$) are turned down over the sides of the slot $a^2$ onto the upper surface of the part $a$ of the loose lid or cover, as will be best understood by reference to Figs. 5 and 6, and the cutter is thereby securely attached to the cover, so as to be capable of a sliding motion, the body of the cutter $b$ closing the slot $a^2$ practically air-tight and dust-proof.

In the modification of my invention illustrated in Figs. 7 to 11, both inclusive, the cutter $b$ is made from a blank without crossing arms $b'$ $b'$, (shown in Figs. 1 to 6, both inclusive,) the said cutter being attached to the loose lid or cover by a rivet-like connection $c$, the stem of which passes through and is capable of working in the single slot $a^2$ of the loose lid or cover.

Where thought necessary or desirable, two of the rivet-like connections $c$ may be employed instead of one only, as shown.

Having now particularly described and ascertained the nature of my invention and in what manner the same is to be performed, I declare that I claim as my invention—

A loose cover or lid for boxes, cans or the like, having a depressed or sunken portion on the under side of its top near one edge to provide a guideway upon such under side, and a single longitudinal slot centrally arranged in the said depressed portion, said slot being of less length than the depression, a cutter-plate lying within and adapted to slide back and forth in the guideway formed by the said depression in the cover and arranged to close the said slot in either position of adjustment, a cutter at one end of said plate, and an attachment for the plate passing up through said longitudinal slot and having portions which overhang the side walls of the slot whereby the said cutter-plate is guided in its movement and retained in position.

GEORGE HENRY WILLIAMSON. [L. S.]

Witnesses:
GEORGE SHAW,
ARTHUR JOHN POWELL.